(12) United States Patent
Ino et al.

(10) Patent No.: US 10,009,849 B2
(45) Date of Patent: *Jun. 26, 2018

(54) MOBILE CLIENT DEVICE, OPERATION METHOD, AND RECORDING MEDIUM

(71) Applicants: Sony Corporation, Tokyo (JP); Sony Mobile Communications, Inc., Tokyo (JP)

(72) Inventors: Yuji Ino, Tokyo (JP); Kenji Tokutake, Kanagawa (JP)

(73) Assignee: Sony Mobile Communications Inc., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/432,487

(22) Filed: Feb. 14, 2017

(65) Prior Publication Data
US 2017/0156116 A1    Jun. 1, 2017

Related U.S. Application Data

(63) Continuation of application No. 15/080,106, filed on Mar. 24, 2016, now Pat. No. 9,600,056, which is a continuation of application No. 14/024,328, filed on Sep. 11, 2013, now Pat. No. 9,323,310.

(60) Provisional application No. 61/702,939, filed on Sep. 19, 2012.

(51) Int. Cl.
| | |
|---|---|
| *H04M 1/00* | (2006.01) |
| *H04B 1/38* | (2015.01) |
| *H04W 52/02* | (2009.01) |
| *H04W 4/00* | (2018.01) |
| *H04M 1/725* | (2006.01) |
| *H04W 4/80* | (2018.01) |

(52) U.S. Cl.
CPC ... *H04W 52/0254* (2013.01); *H04M 1/72583* (2013.01); *H04W 4/008* (2013.01); *H04W 4/80* (2018.02)

(58) Field of Classification Search
CPC .... G06F 1/3231; G06F 1/3206; G06F 1/3265; G06F 9/4418; H04M 1/72597; H04W 4/005; H04W 4/008; H04W 4/20; H04W 12/06; H04W 88/02; Y02B 60/1242
USPC .......................... 455/127.4, 343.1–343.6, 574
See application file for complete search history.

(56) References Cited

U.S. PATENT DOCUMENTS

| | | |
|---|---|---|
| 7,432,948 B2 | 10/2008 | Watanabe et al. |
| 7,606,598 B2 | 10/2009 | Kuhl et al. |
| 8,046,721 B2 | 10/2011 | Chaudhri et al. |
| 8,639,295 B2 | 1/2014 | Hsieh et al. |
| 8,736,555 B2 | 5/2014 | Westerman et al. |
| 2004/0259542 A1 | 12/2004 | Viitamaki |
| 2006/0123041 A1 | 6/2006 | Sandrini et al. |
| 2008/0088473 A1 | 4/2008 | Kim et al. |
| 2010/0039402 A1 | 2/2010 | Okazaki |
| 2010/0062711 A1 | 3/2010 | Park |

(Continued)

*Primary Examiner* — Dominic Rego
(74) *Attorney, Agent, or Firm* — Oblon, McClelland, Maier & Neustadt, L.L.P.

(57) ABSTRACT

An information processing apparatus including a touch panel and a near field communication interface. The information processing apparatus detects that an input received at the touch panel corresponds to a predetermined input when the information processing apparatus is in a suspended state; and controls the information processing apparatus execute a predetermined function via the near field communication interface and awake from the suspended state upon detecting that the input corresponds to the predetermined input.

15 Claims, 10 Drawing Sheets

(56) References Cited

U.S. PATENT DOCUMENTS

| | | |
|---|---|---|
| 2010/0063893 A1 | 3/2010 | Townsend |
| 2010/0066497 A1 | 3/2010 | Lim et al. |
| 2010/0079508 A1 | 4/2010 | Hodge et al. |
| 2011/0012775 A1 | 1/2011 | Richards et al. |
| 2011/0285658 A1 | 11/2011 | Homma et al. |
| 2011/0300902 A1 | 12/2011 | Kwon |
| 2012/0050332 A1 | 3/2012 | Nikara et al. |
| 2012/0125078 A1 | 5/2012 | Iott et al. |
| 2012/0235922 A1 | 9/2012 | Locker et al. |
| 2012/0256854 A1 | 10/2012 | Lee et al. |
| 2013/0007653 A1 | 1/2013 | Stolyarov et al. |
| 2013/0113655 A1 | 5/2013 | Shen et al. |
| 2013/0283196 A1 | 10/2013 | Farnan et al. |
| 2015/0169201 A1 | 6/2015 | Hilbrink et al. |

|    | 1  | 2  | 3   | 4  | 5  | 6  | 7  | 8  | 9  | 10 | (X) |
|----|----|----|-----|----|----|----|----|----|----|----|-----|
| 1  | 10 | 8  | 8   | 10 | 7  | 8  | 7  | 9  | 10 | 8  |     |
| 2  | 8  | 7  | 9   | 7  | 8  | 7  | 8  | 7  | 8  | 8  |     |
| 3  | 8  | 8  | 10  | 7  | 8  | 7  | 9  | 10 | 8  | 9  |     |
| 4  | 7  | 8  | 7   | 8  | 7  | 8  | 8  | 10 | 7  | 9  |     |
| 5  | 7  | 8  | 7   | 10 | 7  | 8  | 7  | 9  | 10 | 8  |     |
| 6  | 10 | 7  | 8   | 8  | 10 | 7  | 8  | 7  | 9  | 10 |     |
| 7  | 7  | 9  | 10  | 10 | 7  | 8  | 8  | 8  | 10 | 7  |     |
| 8  | 7  | 9  | 8   | 10 | 7  | 8  | 7  | 9  | 10 | 8  |     |
| 9  | 8  | 8  | 8   | 7  | 9  | 10 | 8  | 8  | 10 | 7  |     |
| 10 | 9  | 10 | 10  | 8  | 8  | 7  | 9  | 10 | 8  | 10 |     |
| 11 | 8  | 7  | 9   | 9  | 10 | 10 | 8  | 8  | 10 | 7  |     |
| 12 | 8  | 10 | 7   | 9  | 9  | 8  | 10 | 7  | 9  | 10 |     |
| 13 | 8  | 7  | 90  | 10 | 8  | 8  | 7  | 9  | 10 | 8  |     |
| 14 | 7  | 90 | 100 | 90 | 8  | 8  | 10 | 7  | 9  | 9  |     |
| 15 | 8  | 8  | 90  | 8  | 7  | 8  | 7  | 9  | 10 | 8  |     |
| 16 | 9  | 10 | 9   | 10 | 8  | 7  | 9  | 10 | 8  | 10 |     |
| 17 | 8  | 7  | 9   | 10 | 8  | 8  | 7  | 9  | 10 | 8  |     |
| 18 | 8  | 10 | 7   | 9  | 9  | 7  | 8  | 7  | 9  | 10 |     |
| 19 | 8  | 7  | 9   | 10 | 8  | 7  | 10 | 8  | 8  | 10 |     |
| 20 | 8  | 8  | 10  | 7  | 8  | 7  | 9  | 10 | 8  | 9  |     |

(Y)

| | 1 | 2 | 3 | 4 | 5 | 6 | 7 | 8 | 9 | 10 | (X) |
|---|---|---|---|---|---|---|---|---|---|---|---|
| 1 | 70 | 70 | 65 | 80 | 80 | 70 | 70 | 65 | 80 | 80 | |
| 2 | 55 | 55 | 80 | 55 | 80 | 55 | 55 | 80 | 55 | 80 | |
| 3 | 55 | 55 | 75 | 80 | 80 | 55 | 55 | 75 | 80 | 80 | |
| 4 | 65 | 55 | 80 | 40 | 80 | 65 | 55 | 80 | 40 | 80 | |
| 5 | 55 | 55 | 75 | 80 | 80 | 70 | 65 | 80 | 80 | 65 | |
| 6 | 80 | 55 | 80 | 40 | 80 | 55 | 80 | 55 | 80 | 80 | |
| 7 | 80 | 80 | 80 | 80 | 80 | 55 | 75 | 80 | 80 | 50 | |
| 8 | 30 | 70 | 65 | 80 | 80 | 55 | 80 | 40 | 80 | 45 | |
| 9 | 80 | 55 | 80 | 55 | 45 | 70 | 70 | 65 | 80 | 80 | |
| 10 | 80 | 55 | 75 | 80 | 80 | 55 | 55 | 80 | 55 | 30 | |
| 11 | 80 | 55 | 80 | 40 | 80 | 55 | 55 | 75 | 80 | 80 | |
| 12 | 45 | 55 | 80 | 55 | 70 | 65 | 55 | 80 | 40 | 80 | |
| 13 | 80 | 55 | 75 | 80 | 55 | 80 | 55 | 80 | 80 | 80 | |
| 14 | 80 | 55 | 80 | 40 | 55 | 75 | 80 | 80 | 80 | 80 | |
| 15 | 70 | 65 | 80 | 80 | 55 | 80 | 40 | 80 | 80 | 55 | |
| 16 | 55 | 80 | 55 | 80 | 70 | 65 | 80 | 80 | 80 | 40 | |
| 17 | 55 | 75 | 80 | 80 | 55 | 80 | 55 | 80 | 80 | 40 | |
| 18 | 55 | 80 | 40 | 80 | 55 | 75 | 80 | 80 | 80 | 30 | |
| 19 | 80 | 80 | 65 | 80 | 55 | 80 | 40 | 80 | 80 | 80 | |
| 20 | 80 | 80 | 80 | 80 | 65 | 80 | 80 | 80 | 80 | 80 | |

(Y)

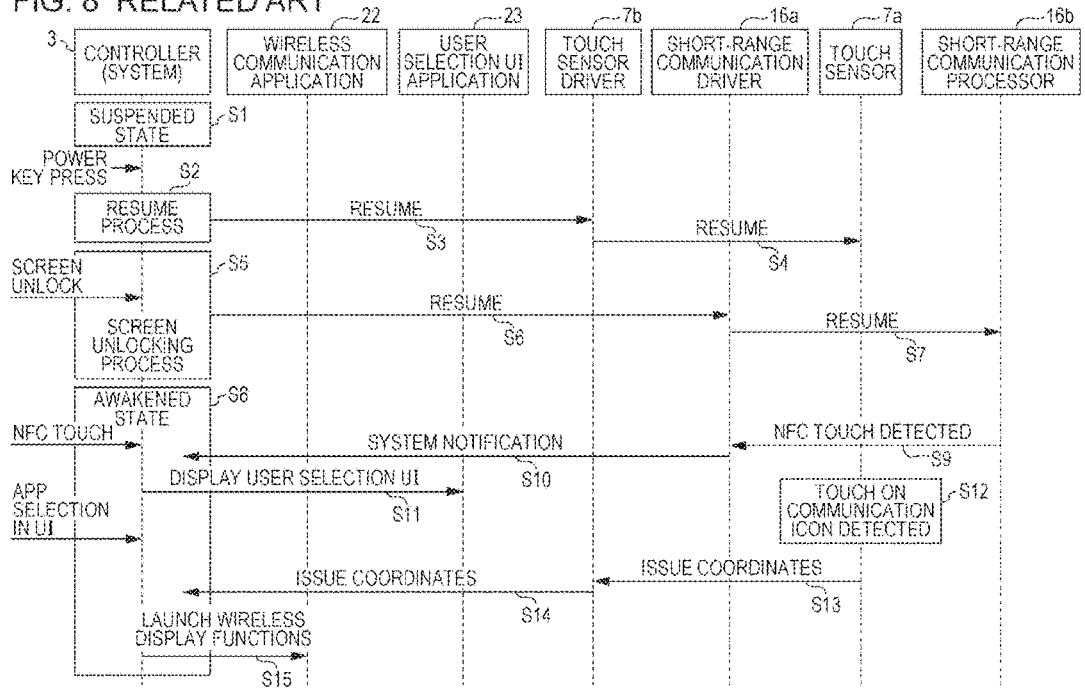

MOBILE CLIENT DEVICE, OPERATION METHOD, AND RECORDING MEDIUM

CROSS REFERENCE TO RELATED APPLICATION

The present continuation application is a continuation of application Ser. No. 15/080,106, filed on Mar. 24, 2016, which is a continuation of U.S. application Ser. No. 14/024,328, now U.S. Pat. No. 9,323,310 filed on Sep. 11, 2013, which claims the benefit of priority from Provisional Application Ser. No. 61/702,939, filed Sep. 19, 2012. The entire contents of all of the above-noted applications are incorporated herein by reference.

BACKGROUND

Field of the Disclosure

The present disclosure relates to a mobile client device, operation method, and recording medium applied in the case where, for example, a user performs an input operation on a touch panel to execute a specific function.

Description of Related Art

Recently, there is increasing adoption of touch panels as an input device by which a user performs input operations on a mobile device such as a mobile phone client device, an advanced mobile information terminal equipped with telephony functions, commonly referred to as a smartphone, or a tablet device. A touch panel is a device in which a display that displays images, etc. and a touch sensor or other position input device are integrally constructed.

In a client device provided with a touch panel, application software (hereinafter abbreviated to "applications" in some cases) operates due to the user performing given operational input on various icons displayed on a screen, for example. Applications are associated with icons, and operate according to the operational input. Known operational input methods include tap operations that tap the screen, drag operations that move a contacting pointing object such as a finger or stylus from a given position to another position, flick operations that move a pointing object across the screen in a sweeping motion, and tap operations that tap the screen with a pointing object.

These various operations are determined on the basis of information on the coordinate position on the screen where the pointing object is in contact or proximity during a series of operations from when the finger contacts the screen until it is released. For example, information such as the variation in coordinate position per unit time, the translational velocity of the coordinate position, and the on-screen surface area where touch is detected are used as information for identifying operational input.

Additionally, in order to reduce power consumption, a mobile client device transitions to a suspended state, i.e., a low-power mode, if no operational input from the user is performed for a fixed amount of time. In the suspended state, the power consumption of the mobile client device is reduced by lowering the intensity of the backlight in the display or suspending various functions. However, information such as the type of operational input performed prior to transitioning to the suspended state is saved to memory. For this reason, the operational input type, etc. can be retrieved from memory and processing can be resumed when awakening from the suspended state (called "waking up"). In the following description, the process of awakening from a suspended state is called "resuming".

Also, methods that detect an operation performed on a touch panel and initiate operation of an electronic device are becoming known. For example, U.S. Pat. No. 8,046,721 describes a method of transitioning an electronic device to an unlocked user interface state in the case where contact with a touch-sensitive display corresponds to a given gesture.

SUMMARY

Meanwhile, near field communication (NFC) exists as a short-range wireless communication standard that enables bidirectional communication by bringing different electronic devices in proximity to each other within a given distance. NFC is used with communication processes like the following. For example, an NFC-equipped mobile client device is first brought close to a PC or other electronic device to conduct authentication and establish a communication link (hereinafter, such an operation is called an "NFC touch"). After that, high-speed wireless communication compatible with a standard such as Bluetooth (registered trademark) is conducted. Thus, photos or videos shot with the mobile client device can be transferred to an electronic device.

Meanwhile, multiple use cases are envisioned for wireless communication using NFC depending on the combination of electronic devices. For example, there exist use cases configured for data transmitting and receiving between different electronic devices, electronic money payments, and entrance/exit management using electronic tickets.

Although various such use cases are envisioned, only one type of use cases can be selected by simply performing an NFC touch only. For this reason, conventionally the user has selected a use case from icons on a popup user interface (UI) displayed on the screen of a mobile client device after performing an NFC touch. However, use cases in which a use case is selected using a popup UI imposes many operations on the user.

Furthermore, if the mobile client device is always in an awake state, power consumption is increased even when the mobile client device is not in use, and the mobile client device may be used in unintended ways by other persons in some cases. For this reason, measures have been taken such that the backlight of the display is dimmed to reduce power consumption when the mobile client device is not in use, and the mobile client device is not awakened from a suspended state unless a password known only to the user is input. For this reason, when the user uses NFC, it is necessary to enable NFC after first awakening the mobile client device from a suspended state to release the screen lock and performing an operation causing a home screen to be displayed.

In this way, the sequence until communication processes using NFC are conducted is complex and burdensome, and the user has not been able to rapidly select a desired use case.

For this reason, the Inventors have recognized the need to cause a mobile client device in a suspended state to rapidly execute a specific function using wireless communication.

According to one exemplary embodiment, the disclosure is directed to an information processing apparatus including a touch panel and a near field communication interface. The information processing apparatus detects that an input received at the touch panel corresponds to a predetermined input when the information processing apparatus is in a suspended state; and controls the information processing apparatus execute a predetermined function via the near field communication interface and awake from the suspended state upon detecting that the input corresponds to the predetermined input.

In so doing, short-range communication is conducted by a machine-to-machine (M2M) communication processor on the basis of the pattern of an input operation, and a specific function is executed.

According to the present disclosure, it is configured such that an M2M communication processor in an awakened state conducts short-range communication, and a specific function desired by the user is executed according to the pattern of an input operation. For this reason, a specific function can be rapidly executed.

BRIEF DESCRIPTION OF DRAWINGS

FIG. 8 is a sequence diagram illustrating an exemplary process in which a wireless communication application is activated and short-range communication is conducted by conventional operations.

DETAILED DESCRIPTION

Figure 1:
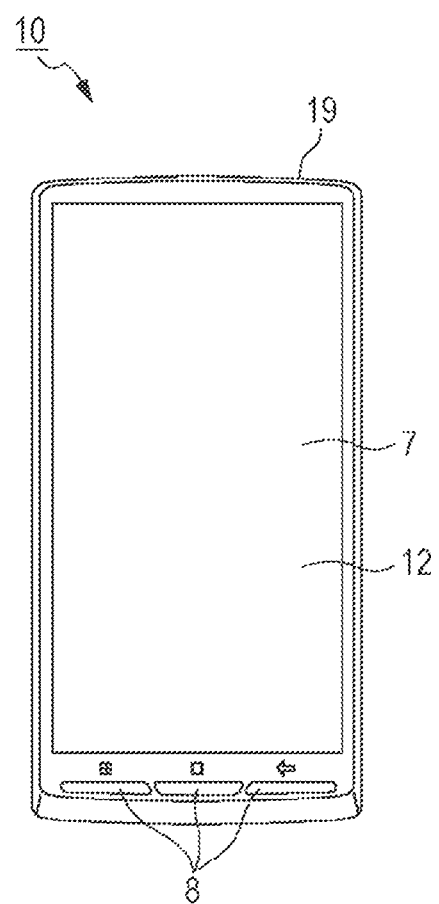
FIG. 1 is a schematic diagram illustrating an exemplary exterior configuration of a mobile client device according to an exemplary embodiment of the present disclosure.

Hereinafter, an embodiment of the present disclosure will be described. The description will proceed in the following order. Note that like reference signs are given to shared parts, and detailed description thereof will be reduced or omitted.
<Preliminary explanation>
<Exemplary embodiment>
1. Exemplary exterior configuration of mobile client device
2. Exemplary internal configuration of mobile client device
3. Exemplary software configuration
4. Examples of touch sensor scans
5. Examples of gesture operations
6. Exemplary comparison of processes for executing wireless display function
<Exemplary modifications>
<Preliminary Explanation>

The Inventors first conducted the following investigation.

Figure 10A:
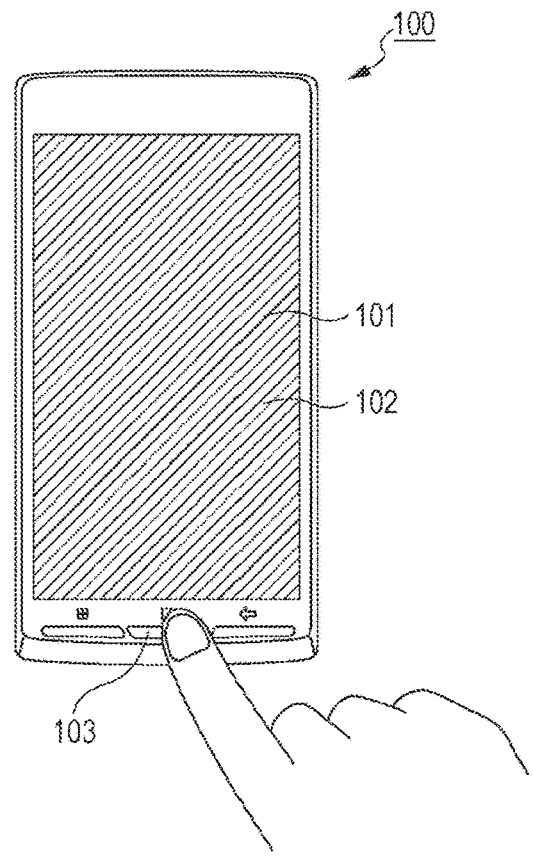
FIGS. 10A and 10B are schematic diagrams illustrating an exemplary exterior configuration of a conventional mobile client device.
Figure 10B:
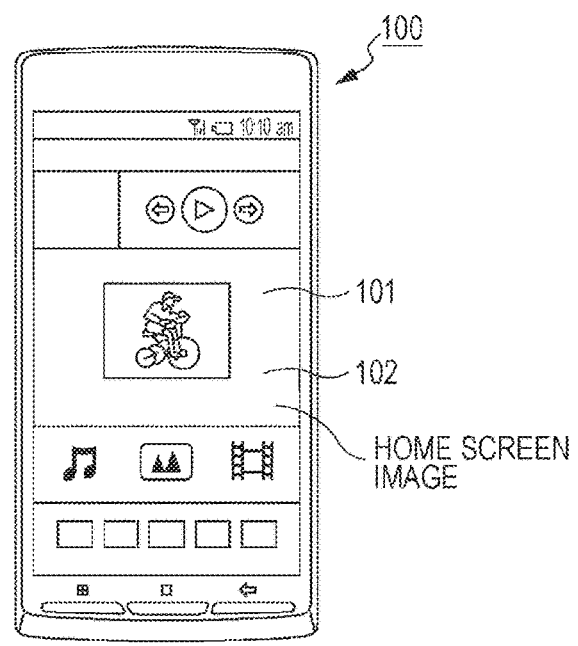

FIGS. 10A and 10B are schematic diagrams illustrating an exemplary exterior configuration of a conventional mobile client device 100. FIG. 10A illustrates an example of an operation that awakens the mobile client device 100 from a suspended state, while FIG. 10B illustrates an example of an application being activated and icons, etc. being displayed on a display 102 due to resuming.

The mobile client device 100 is provided with a touch panel 101, a display 102 on which the touch panel 101 is overlaid, and a home button 103 that displays a home screen due to being pressed by the user. Assume for example that an operation pressing the home button 103 is performed by the user with his or her finger when the mobile client device 100 is in a suspended state (see FIG. 10A). When the components of the mobile client device 100 enter an awakened state due to resuming, a home screen is displayed on the display 102 (see FIG. 10B). On the home screen, various pictures and function icons are listed.

In the conventional mobile client device 100 as described above, once the home screen is displayed, the user activates an application by selecting a function icon corresponding to the application he or she wants to activate. However, the operation of selecting a function icon via the home screen at every resume involves more time and effort, and the intended function cannot be rapidly utilized. Also, resuming requires initialization processes, etc. for each processing block corresponding to the intended function, and thus is a factor that delays the activation of the application.

As a result of the above investigation, the Inventors discovered the configuration and processing of a mobile client device 10 according to an exemplary embodiment of the present disclosure. Herein, a process of executing a specific function with a combination of gesture operations and short-range wireless communication using NFC will be described.

Hereinafter, an exemplary configuration and exemplary operation of a mobile client device 10 according to an exemplary embodiment of the present disclosure will be described with reference to FIGS. 1 to 9. In the mobile client device 10, an operation method is realized by internal blocks to be discussed later working in conjunction with each other as a result of a computer executing a program.

Exemplary Embodiment

[1. Exemplary Exterior Configuration of Mobile Client Device]

FIG. 1 is a schematic diagram illustrating an exemplary exterior configuration of the mobile client device 10.

The mobile client device 10 includes a case 19, a touch panel 7 which is housed in the front portion of the case 19 and upon which input operations are performed by a pointing object, and operable keys 8 which may be provided on the lower part of the front of the case 19.

The touch panel 7 is used as an input device by which the user performs input operations. The touch panel 7 may be realized with a capacitive sensor, for example. Additionally, the touch panel 7 is integrally formed with a touch sensor 7a (see FIG. 2) used as a position input device which accepts the input of positions indicated by a pointing object such as a finger or stylus, and a display 12 that displays images, etc.

The display 12 may be constructed with an LCD panel or an organic electroluminescent (EL) panel, for example.

The following techniques are used as sensing techniques by which the touch panel 7 detects input operations performed by a pointing object. For example, there exist resistive techniques which detect resistivity changes in a portion contacted by a pointing object, electromagnetic induction techniques which detect the electromagnetic energy of a specialized pointing object that produces a magnetic field, and capacitive techniques which detect changes in the capacitance values of a contacted portion.

Herein, an example will be described in which a finger is used as the pointing object that performs input operations on the touch panel 7.

In the mobile client device 10, given operations may be input by the user on various icons displayed on the screen of the display 12, thereby causing the various applications associated with those icons to operate according to the input operation type, for example. Input operation types include, for example, tap operations, drag operations, or flick operations, as well as gesture operations to be described later.

The operable keys 8 may be provided with a home button, a power button, and volume buttons, etc. (not illustrated). If the user presses the home button, a home screen can be displayed on the display 12. Also, if the power button is pressed, the power of the mobile client device 10 can be switched on or off. Also, if the volume buttons are pressed, the volume during telephony or music playback can be increased or decreased.

[2. Exemplary Internal Configuration of Mobile Client Device]

Figure 2:
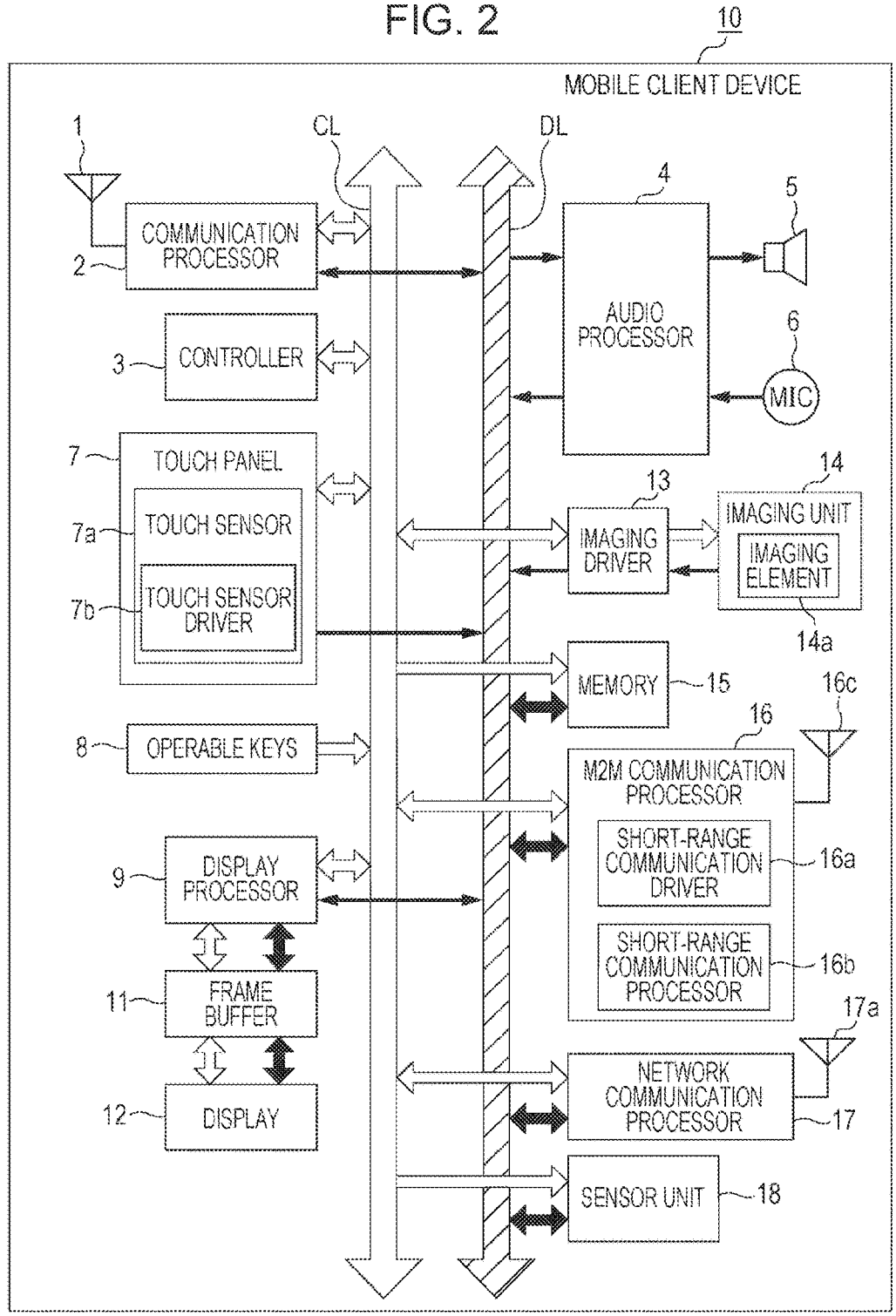
FIG. 2 is a block diagram illustrating an exemplary internal configuration of a mobile phone client device according to an exemplary embodiment of the present disclosure.

FIG. 2 is a block diagram illustrating an exemplary internal configuration of the mobile client device 10.

The mobile client device 10 is provided with an antenna 1 that transmits and receives radio waves to and from a wireless telephone base station, a communication processor 2 connected to the antenna 1, and a controller 3. Also provided are an audio processor 4, a speaker 5, and a microphone 6.

The communication processor 2 wirelessly communicates with a wireless telephone base station according to control by the controller 3. During audio telephony, audio data included in data received by the communication processor 2 is subjected to audio processing, and after that the processed audio data is supplied to the audio processor 4 which causes the speaker 5 to emit audio. Then, an audio data decoding process is conducted by the audio processor 4, and an analog audio signal is obtained. The analog audio signal obtained by the audio processor 4 is supplied to the speaker 5, which is an example of a sound-emitting unit, and output as audio. An audio signal obtained as a result of audio pickup by the microphone 6 is also supplied to the audio processor 4, and the audio data is encoded by the audio processor 4 into a given encoding format (pulse width modulation (PWM)), for example). Then, the obtained audio data is supplied to the communication processor 2 and emitted as a wireless radio wave via the antenna 1.

Processors such as the communication processor 2 and the audio processor 4 exchange control data with the controller 3 via a control line CL, while also transmitting data via a data line DL.

The controller 3 may be constructed with a central processing unit (CPU) or graphics processing unit (GPU), and controls the respective units constituting the mobile client device 10. If the touch sensor 7a detects the pattern of an input operation during a suspended state, the controller 3 resumes an M2M communication processor 16 to be discussed later, bringing it into an awakened state. Then, if the M2M communication processor 16 conducts short-range communication, the controller 3 is made to execute a specific function via the M2M communication processor 16 on the basis of the pattern of the input operation.

The specific function may include a first communication function and a second communication function, for example. The first communication function is one that connects an electronic device to a network via a network communication processor 17, on the basis of information identifying the electronic device and received from the electronic device by the M2M communication processor 16. In the following description, a PC 40 is presented as an example of an "electronic device". The second communication function is one that transfers an image being displayed on the display 12 to an electronic device, and causes the transferred image to be displayed by the electronic device.

The mobile client device 10 is also provided with a touch panel 7 and operable keys 8. Included in the touch panel 7 are a touch sensor 7a and a touch sensor driver 7b. The touch sensor 7a is used as an input detector that detects the pattern of an input operation from the contact or non-contact of a pointing object used to perform input operations on an operable surface by measuring changes in capacitance values detected by the touch sensor driver 7b. The touch sensor 7a is constructed with sensors which are of the mutual capacitive type of projected capacitance touch technology, in which transmit electrodes (TX) and receive electrodes (RX) not illustrated are arrayed in a matrix in the X and Y directions, for example.

In the touch sensor 7a, by grounding the receive electrodes and inputting a drive pulse into the transmit electrodes, an electric field is produced between the transmit electrodes and the receive electrodes. If a pointing object which is a type of conducting object, such as the user's finger or a stylus, approaches the surface of the touch panel 7 (hereinafter called the "operable surface"), the electric field between the transmit electrodes and the receive electrodes decreases, since a portion of the electric field is absorbed by the conducting object. Accordingly, the charge (capacitance) in the receive electrodes also decreases. Consequently, the touch sensor 7a is able to detect contact and non-contact of a pointing object with respect to the operable surface by measuring decreases in charge due to decreases in the electric field between the transmit electrodes and the receive electrodes.

This touch sensor 7a detects the position of a pointing object on the touch panel 7 from the position on the operable surface where contact or proximity of the pointing object is detected. Additionally, XY coordinate information corresponding to the position is also output. Types of user-performed input operations include tap operations, drag operations, and flick operations as discussed earlier, as well as pinch operations (pinch/spread) in which the spacing between two fingers is made wider or narrower, and operations that depend on the number of fingers contacting the operable surface. Furthermore, the touch sensor 7a detects the pattern of an input operation performed on the touch panel 7 by the pointing object on the basis of the position on the screen (coordinate information, etc.) where the pointing object is in contact or proximity during a series of operations from when the pointing object contacts the operable surface until it is released. At this point, the touch sensor 7a determines the type of pointing object (finger, etc.) in contact with or in proximity to the operable surface and the number of pointing objects, etc. on the basis of capacitance values detected by the touch sensor 7a. The capacitance values may include information on the distribution over the operable surface and magnitudes of capacitance, for example.

The touch sensor driver 7b inputs drive pulses into each transmit electrode and detects the charge in the receive electrodes. Also, if the touch sensor 7a detects a gesture operation during a suspended state, the touch sensor driver 7b issues instructions for initiating a resume to the controller 3.

The controller 3 controls a display processor 9 and applies control causing the display 12 to display given screens.

The display processor 9 causes the display 12 to display screens corresponding to applications executed by the controller 3. For example, the display 12 may be made to display pictures shot by a camera application. Also, on the basis of input operations performed on the operable surface, a web browser, etc. may be scrolled up or down, a screen may be moved on the basis of a flick operation, or a selected area may be enlarged or reduced on the basis of a pinch operation in some cases. When displaying an image on the display 12, the display processor 9 saves several frames' worth of picture data in a frame buffer 11. The frame buffer 11 is memory that saves picture data by FIFO (First In, First Out). The display 12 displays pictures on the basis of picture data for individual frames read out from the frame buffer 11.

The mobile client device 10 is also provided with an imaging driver 13, an imaging unit 14, memory 15, an M2M communication processor 16, a network communication processor 17, and a sensor unit 18.

The imaging unit 14 is provided with an imaging element 14a consisting of an image sensor such as a charge-coupled device (CCD) or complementary metal-oxide-semiconductor (CMOS), for example. The imaging unit 14 is also provided with optics consisting of a lens, shutter, etc. (not illustrated) for imaging subjects. Additionally, the imaging unit 14 generates an image signal by photoelectrically converting subject light focused onto its photosensor surface via a lens not illustrated. Imaging operation of the imaging unit 14 is controlled by the imaging driver 13.

The display processor 9, frame buffer 11, display 12, memory 15, M2M communication processor 16 (short-range communication driver 16a, short-range communication processor 16b), and network communication processor 17 are used as controlled units. Operation of the controlled units is controlled via middleware (see FIG. 3, discussed later) that operates according to instructions from application software in the case where an input operation is performed on the touch panel 7 while the application software is in an activated state. Additionally, operation of the controlled units is controlled from middleware if in a suspended state.

If the pattern of an input operation is detected during a suspended state in which application software and middleware are not activated, the touch sensor driver 7b initiates resuming by the controller 3, and activates the controller 3 to bring it from a suspended state to an awakened state. Then, the controller 3 initiates resuming of a quick launcher 31, which is middleware, and also initiates resuming of the M2M communication processor 16 (see FIG. 9, discussed later). Then, the quick launcher 31 causes the controlled unit determined to be the target of operation to execute given behavior corresponding to the pattern of the input operation.

The memory 15 is constructed with read-only memory (ROM) and random access memory (RAM), and stores various application software as well as data required when executing such application software. On the basis of the pattern of an input operation detected by the touch sensor 7a, the controller 3 is able to select the execution of either a process that transmits data read out from the memory 15 to an electronic device, or a process in which the M2M communication processor 16 receives data from an electronic device, and the data is saved to the memory 15.

The M2M communication processor 16 conducts wireless short-range communication with nearby electronic devices via a connected antenna 16c on the basis of a protocol conforming to a given communication standard.

The M2M communication processor 16 is provided with a short-range communication driver 16a and a short-range communication processor 16b. The short-range communication driver 16a controls the behavior of the short-range communication processor 16b. The short-range communication processor 16b transmits and receives data processed in accordance with NFC, which is an example of a short-range communication standard, via the antenna 16c to and from an electronic device that has been brought close to the mobile client device 10.

The network communication processor 17 connects to a network such as the Internet or an intranet via a connected antenna 17a on the basis of various protocols conforming to given communication standards. The network communication processor 17 is able to conduct data communication using Wi-Fi (registered trademark), for example.

The sensor unit 18 is configured to include an acceleration sensor and a geomagnetic sensor, etc., and outputs given sensor values. Additionally, the controller 3 determines the specific function type on the basis of the combination of the pattern of an input operation detected by the touch sensor 7a and the sensor values. For example, from sensor values output by an acceleration sensor, the controller 3 is able to compute operations in which the mobile client device 10 is lifted up or waved, and also compute the orientation in which the mobile client device 10 is being used.

[3. Exemplary Layer Configuration]

Figure 3:
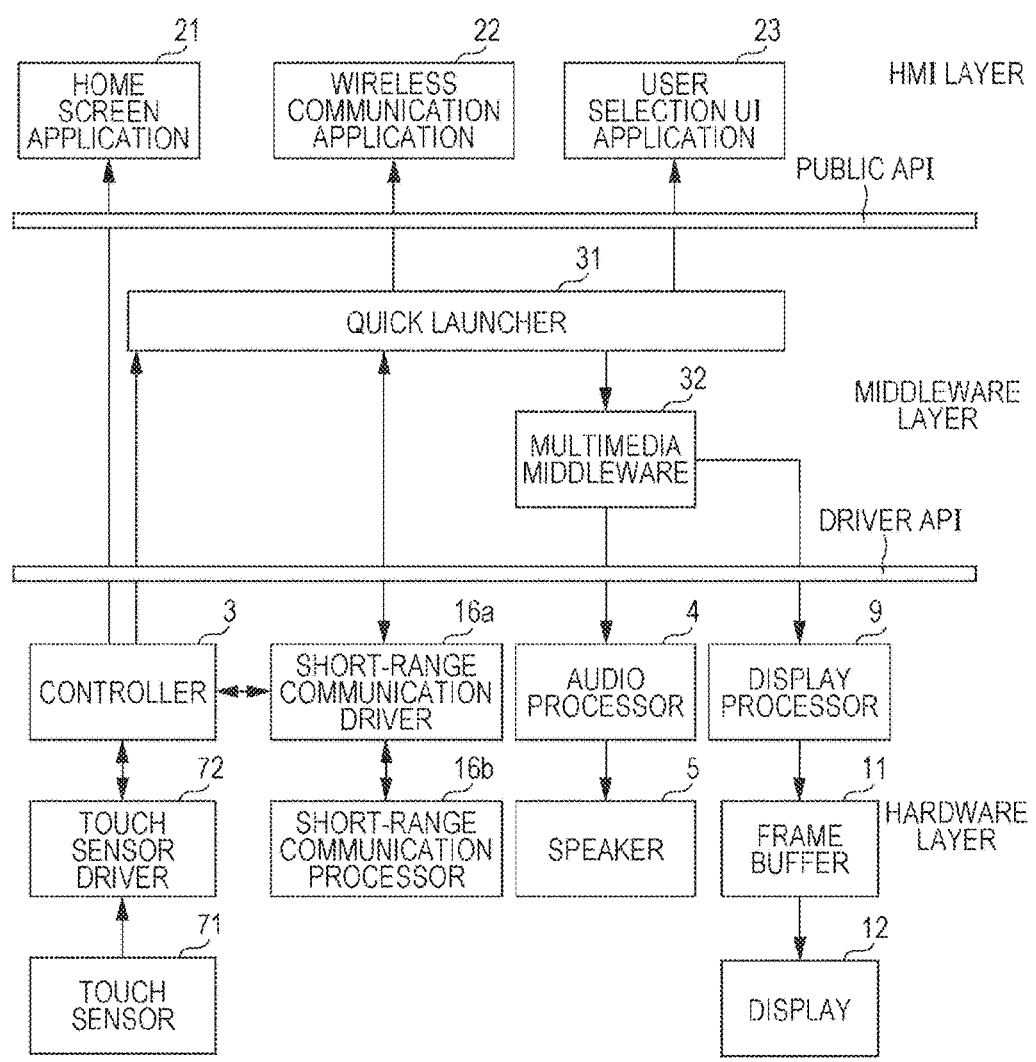
FIG. 3 is an explanatory diagram illustrating an exemplary layer configuration of software and hardware operating in a mobile client device according to an exemplary embodiment of the present disclosure.

FIG. 3 is an explanatory diagram illustrating an exemplary layer configuration of software and hardware operating in the mobile client device 10.

In the mobile client device 10, a human-machine interface (HMI) layer, a middleware layer, and a hardware layer are set, and the various modules in each layer operate in association with each other. The module groups included in the HMI layer and the middleware layer are called "software", in contradistinction to hardware.

In the following description, the applications and middleware included in the respective layers and the software that manages the behavior of the respective units provided in the mobile client device 10 under control by the controller 3 are called the "system". The system may be an operating system (OS), for example. The system conducts processes such as interrupt control and timeout management, and outputs various commands, while also applying control that manages the behavior of the mobile client device 10 as a whole and causes resume and suspend processes to operate in respective units.

Although not fully illustrated, the respective units provided in the mobile client device 10 described in FIG. 2 are included in the hardware layer. Data is passed between the HMI layer and the middleware layer via a public application programming interface (API) that mediates the processes of various application software. Data is passed between the middleware layer and the hardware layer via a driver API that mediates processes with respect to respective units provided in the mobile client device 10.

The HMI layer includes various modules such as a home screen application 21, a wireless communication application 22, and a user selection UI application 23. The home screen application 21 controls the displaying of a home screen on the display 12. The wireless communication application 22 applies control causing the communication processor 2 to conduct wireless communication on the basis of a tethering function or a wireless display function to be discussed later. The user selection UI application 23 controls the popup display on the display 12 of a user selection UI that includes icons prompting the user to select either the tethering function or the wireless display function as the function able to use NFC. Then, control may be applied causing the M2M communication processor 16 to conduct wireless communication on the basis of the selected function.

The middleware layer includes a quick launcher 31 and a multimedia middleware 32 as examples of middleware. The quick launcher 31 initiates resuming of the system (controller 3) of the mobile client device 10 in a suspended state, for example. Note that the quick launcher 31 is able to induce launching at high speed by applying sequence control to respective units in the hardware layer during a resume. Functions by which the quick launcher 31 applies sequence control may include a function that controls the series of operations required to execute display functions, and a function that loads picture data whose playback was stopped into the frame buffer 11 to increase the speed of reading operations, for example.

In addition, the quick launcher 31 is also used as communication middleware that issues instructions input from the wireless communication application 22 to the short-range communication driver 16a, while also outputting communication results received from the short-range communication driver 16a to the display 12.

Note that, conventionally, a process to display a home screen on the display 12 is conducted according to control by the home screen application 21 during the process of awakening a suspended system by resuming. The home screen that has been activated due to resuming is in an unlocked state enabling operational input by the user.

However, in the mobile client device 10 according to this exemplary embodiment, when the system is awakened from a suspended state, the controller 3 in the hardware layer controls the behavior of respective units in the hardware layer directly, bypassing the HMI layer. For example, in the mobile client device 10, the controller 3 directly controls the short-range communication driver 16a to cause the short-range communication processor 16b to conduct wireless communication by NFC, bypassing operation by the wireless communication application 22.

In addition, the quick launcher 31 controls the behavior of the display processor 9 by directly controlling the multimedia middleware 32, and causes picture data to be buffered in the frame buffer 11. Picture data read out from the frame buffer 11 is then output to the display 12 and a picture is displayed. Also, the multimedia middleware 32 causes audio or other data to be subjected to codec or other processing by the audio processor 4, the processed audio data is output to the speaker 5, and audio is emitted.

In this way, in the mobile client device 10 there are realized shortcut functions for rapidly executing various functions while bypassing control from the HMI layer via the public API.

[4. Examples of Touch Sensor Scans]

Exemplary scans by the touch sensor 7a when detecting that operational input has been performed by a pointing object contacting the operable surface will now be described with reference to FIGS. 4A to 6B.

Figure 4A:
FIGS. 4A and 4B are explanatory diagrams illustrating examples of an ordinary scan and an intermittent scan according to an exemplary embodiment of the present disclosure.
Figure 4B:

FIGS. 4A and 4B are explanatory diagrams illustrating examples of an ordinary scan and an intermittent scan. FIG. 4A illustrates an example of an ordinary scan, while FIG. 4B illustrates an example of an intermittent scan. In FIGS. 4A and 4B, the horizontal axis represents time (t), while the vertical axis represents the magnitude of the scan current.

The ordinary scan illustrated in FIG. 4A is conducted in the case where the mobile client device 10 is not in a suspended state. In an ordinary scan, the surface of the touch sensor 7a is scanned at a scan rate of 60 Hz, for example. Since results are returned rapidly in response to operational input from the user, responsiveness is high. However, since an ordinary scan has a large scan count, power consumption by the touch panel 7 also increases.

The intermittent scan illustrated in FIG. 4B is conducted in the case where the mobile client device 10 is in a suspended state. At this point, the touch sensor 7a used as the input detector lowers the execution frequency of the process for detecting input operations performed on the touch panel if an input operation performed on the touch panel is not detected for a given period.

In an intermittent scan, the surface of the touch sensor 7a is scanned at a scan rate of 10 Hz, for example, and a sleep period, during which various functions of the mobile client device 10 are suspended, is provided between every single scan. For this reason, power consumption is lower with an intermittent scan compared to an ordinary scan. Also, since there is a low frequency of operational input from the user being conducted during a suspended state, when a tap or drag operation is conducted it is sufficient to detect these operations. Operational input from the user is still detected with an intermittent scan, and if it is configured such that ordinary scans are conducted after resuming, inconveniences in usability do not occur.

Figures 5A, 5B:
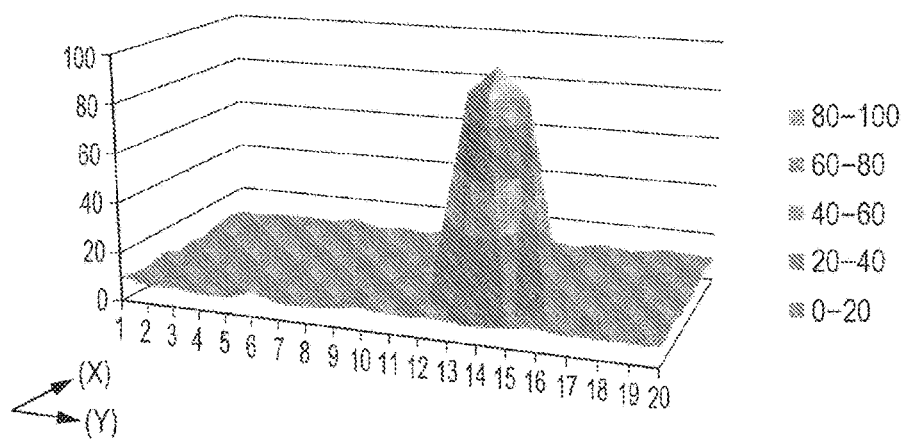
FIGS. 5A and 5B are explanatory diagrams illustrating exemplary capacitance values detected on an operable surface by a touch sensor during a touch operation in an ordinary state according to an exemplary embodiment of the present disclosure.

FIGS. 5A and 5B are explanatory diagrams illustrating exemplary capacitance values detected on the operable surface by the touch sensor 7a during a touch operation in an ordinary state. FIG. 5A illustrates an example of capacitance values during a touch operation in an ordinary state, while FIG. 5B illustrates an example of displaying the capacitance values as a 3D graph. Note that in FIGS. 5 and 6, the short edge of the touch panel 7 is taken to be X and the long edge as Y, and hereinafter, coordinates on the touch panel 7 and coordinates on the touch sensor 7a will be described as being equivalent.

As illustrated in FIG. 5A, a finger contacts a position at the coordinates (X, Y)=(3, 14) on the touch panel 7. At this point, since the capacitance values (90 to 100) in the vicinity of the position at coordinates (3, 14) are higher than the capacitance values (7 to 10) detected at other positions, the touch sensor 7a detects that operational input has been performed on the touch panel 7. The 3D graph of capacitance values illustrated in FIG. 5B demonstrates that the capacitance values of the position at coordinates (3, 14) are projecting out. It may be configured such that a given threshold value (50, for example) is provided for the capacitance values, with a touch operation being detected in the case where the capacitance values exceed the threshold value.

Figures 6A, 6B:
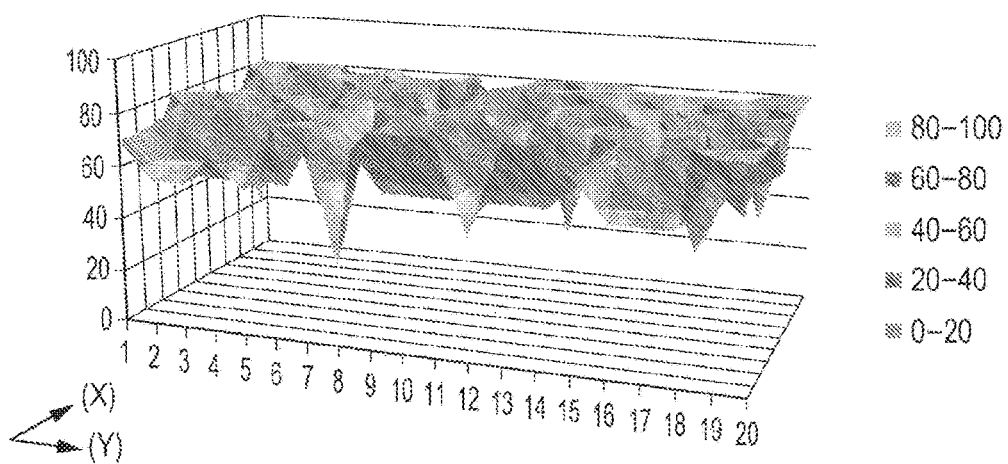
FIGS. 6A and 6B are explanatory diagrams illustrating exemplary capacitance values detected on an operable surface by a touch sensor in a state where a mobile client device is inside the user's pocket, etc., according to an exemplary embodiment of the present disclosure.

FIGS. 6A and 6B are explanatory diagrams illustrating exemplary capacitance values detected on the operable surface by the touch sensor 7a in a state where the mobile client device 10 is inside the user's pocket, etc. FIG. 6A illustrates an example of capacitance values in the case where the mobile client device 10 is inside the user's pocket, etc., while FIG. 6B illustrates an example of displaying the capacitance values as a 3D graph.

As illustrated in FIG. 6A, in the case where the mobile client device 10 is inside the user's pocket, etc., the user's body is contacting the entire surface of the touch panel 7 via his or her clothing, etc., and the touch sensor 7a outputs capacitance values (40 to 80) across the entire surface. At this point, from the high capacitance values being detected across the entire surface of the touch panel 7, the touch sensor driver 7b determines that although an object is contacting the touch panel 7 for some reason, intentional operational input is not being performed by the user. The 3D graph of capacitance values illustrated in FIG. 6B demonstrates that high capacitance values are being detected across the entire surface of the touch sensor 7a.

When detecting capacitance values across the entire surface of the touch sensor 7a in this way, the touch sensor driver 7b does not detect them as touch operations so as to not cause the mobile client device 10 to operate incorrectly while in a suspended state. Additionally, incorrect operation is prevented by applying control such that given processing is conducted in the case where the touch sensor 7a detects capacitance values for a gesture operation with a specific pattern to be discussed later.

[5. Examples of Gesture Operations]

Next, examples of gesture operations according to this exemplary embodiment will be described with reference to FIGS. 7A and 7B.

Figure 7A:
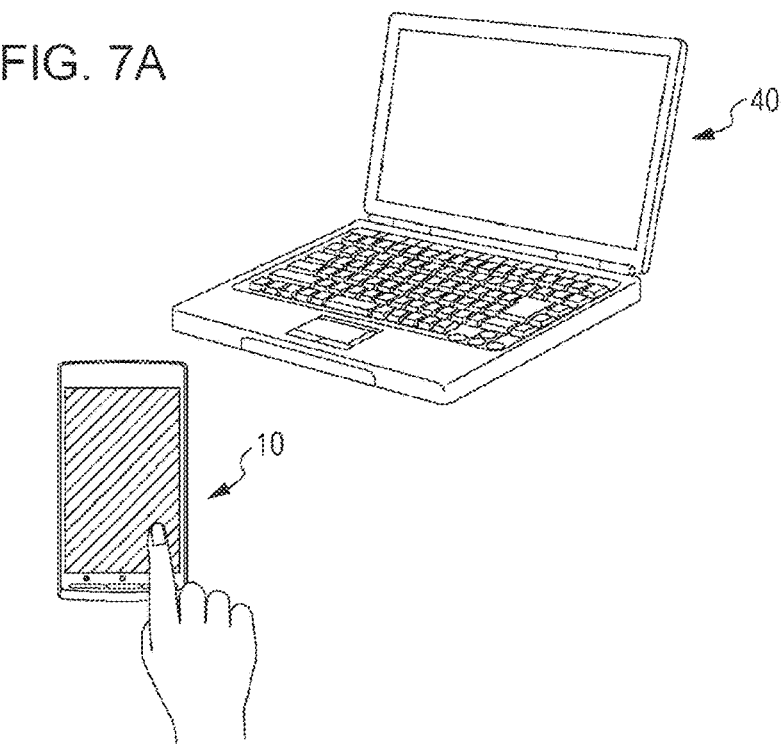
FIGS. 7A and 7B are explanatory diagrams illustrating examples of displaying a home screen from a suspended state with a gesture operation according to an exemplary embodiment of the present disclosure.
Figure 7B:
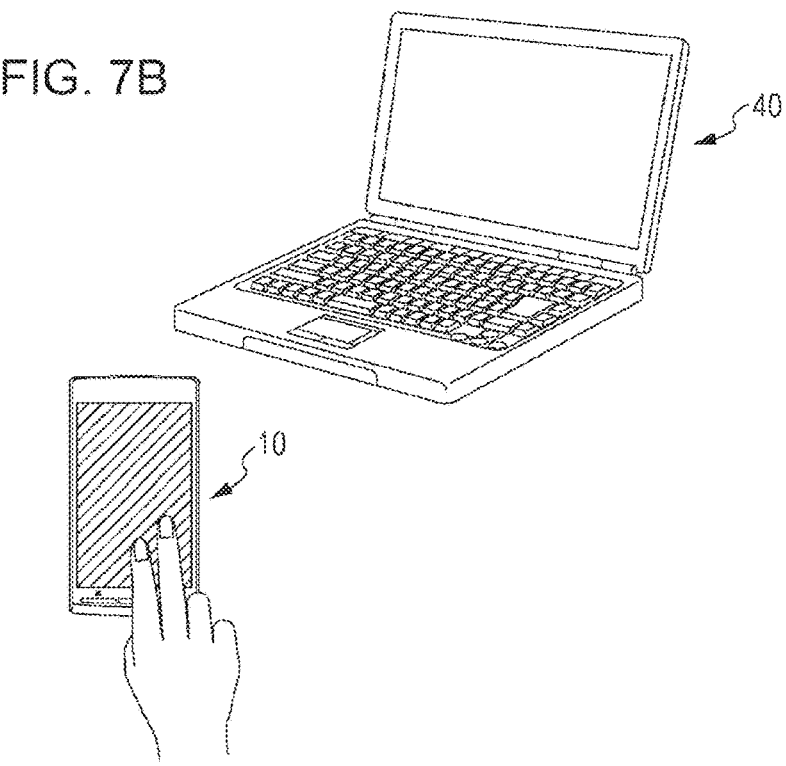

FIGS. 7A and 7B are explanatory diagrams illustrating examples of displaying a home screen from a suspended state with a gesture operation. FIG. 7A illustrates an example of a first gesture operation performed by the user on the touch panel 7, while FIG. 7B illustrates an example of a second gesture operation performed by the user on the touch panel 7.

FIGS. 7A and 7B illustrate examples in which short-range communication is initiated by NFC touching the mobile client device 10 to a PC 40 while the operable surface is being touched with a pointing object.

Note that although the mobile client device 10 is in a suspended state, it is possible to continue the process of detecting touch by intermittently scanning the surface of the touch panel 7 as illustrated in FIG. 4B.

The first gesture operation illustrated in FIG. 7A, being an example of an input operation, is an operation that brings the mobile client device 10 close to the PC 40 while touching the touch panel 7 with a single fingertip when the mobile client device 10 is in a suspended state.

If the touch sensor 7a detects that a single finger has touched the operable surface, the mobile client device 10 initiates resuming from the suspended state. Then, if the mobile client device 10 is brought close to the PC 40 to perform an NFC touch while the single finger is touching the operable surface, the mobile client device 10 and the PC 40 initiate short-range wireless communication by NFC with each other. During the NFC touch, the mobile client device 10 is brought to within approximately 1 cm of the PC 40.

If an NFC touch is performed, the mobile client device 10 receives information for conducting short-range communication from the PC 40, in the form of the MAC address of the PC 40, an ID, and a password, for example. After that, the mobile client device 10 enables a tethering function in which the mobile client device 10 itself is used as a wireless router for connecting to the Internet, and causes the PC 40 to connect to the Internet by connecting the network communication processor 17 to an access point not illustrated in the drawings. For this reason, the user is able to connect the PC 40 to the Internet via the mobile client device 10 with a simple operation.

The second gesture operation illustrated in FIG. 7B, being an example of an input operation, is an operation that brings the mobile client device 10 close to the PC 40 while touching the touch panel 7 with two fingertips when the mobile client device 10 is in a suspended state.

If the touch sensor 7a detects that two fingers have touched the operable surface, the mobile client device 10 initiates resuming from the suspended state. Then, if the mobile client device 10 is brought close to the PC 40 to perform an NFC touch while the two fingers are touching the operable surface, the mobile client device 10 and the PC 40 initiate short-range wireless communication by NFC with each other.

If an NFC touch is performed, the mobile client device 10 activates the home screen while also activating a wireless display function that causes images being displayed on the mobile client device 10 (such as the home screen and photographs selected by the user) to be displayed on the display of the PC 40.

In this way, although the mobile client device 10 is in a suspended state, different functions can be realized by performing a first or a second gesture operation before performing an NFC touch.

Next, an exemplary comparison of processing sequences for the case of executing a wireless display function by performing an NFC touch with conventional operations and the case of executing a wireless display function by performing an NFC touch with an operation according to this exemplary embodiment will be described with reference to FIGS. 8 and 9. Note that it is possible for the mobile client device 10 according to this exemplary embodiment to both execute functions by conventional operations as well as execute functions by operations according to this exemplary embodiment.

[6. Exemplary Comparison of Processes for Executing Wireless Display Function]

FIG. 8 is a sequence diagram illustrating an exemplary process in which a wireless display function is executed by conventional operations.

With conventional operations, resuming is initiated after the user presses the power key during a suspended state, and after the system of the mobile client device 10 enters an awakened state, a user selection UI is displayed and an icon is selected from the user selection UI. Via such operations, it is possible to activate the wireless communication application 22.

In the following description, putting the mobile client device 10 in a suspended state and transitioning to an awakened state is expressed by the controller 3 given as the system illustrated in the sequence diagram.

First, the system is taken to be in a suspended state (step S1). If a power key included among the operable keys 8 is pressed while the system is in a suspended state, resuming of the system is activated (step S2).

If resuming is activated, the controller 3 outputs a resume command to the touch sensor driver 7b (step S3), and the touch sensor driver 7b resumes the touch sensor 7a (step S4). Then, there is a standby until the touch sensor 7a detects an input operation performed on the operable surface.

Next, an input screen prompting for input of authentication information such as a password is displayed on the display 12, which is not illustrated in FIG. 8. Although the system has transitioned to initiating resuming from a suspended state, it remains locked and does not accept operations from the user unless authentication information is input on the input screen.

In order to release the lock, the user touches the touch panel 7 upon which the input screen is displayed and performs a screen unlocking operation that inputs authentication information. The touch panel 7 sends the input authentication information to the controller 3, and the controller 3 conducts user authentication on the basis of the received authentication information. Then, if it is determined that a user with legitimate rights has input authentication information, the controller 3 conducts a screen unlocking process (step S5) and allows input operations on the operable surface.

If the screen unlocking process is conducted, the controller 3 outputs a resume command to the short-range communication driver 16*a* (step S6). The short-range communication driver 16*a* resumes the short-range communication processor 16*b* (step S7). Once the resuming of respective units completes, the system enters an awakened state that returns a response to the operational input from the user (step S8). The short-range communication processor 16*b* then stands by until an NFC touch is detected.

If an NFC touch is performed by the user, the short-range communication processor 16*b* notifies the short-range communication driver 16*a* that it has detected the performing of an NFC touch (step S9). The short-range communication driver 16*a* then notifies the controller 3 that an NFC touch has been performed (step S10).

Upon receiving a notification indicating that an NFC touch has been performed, the controller 3 outputs a command to the user selection UI application 23 causing the display 12 to display a user selection UI (step S11). The user selection UI is displayed in the form of multiple communication icons on the display 12. Included among the communication icons are an icon for executing a tethering function and an icon for executing a wireless display function.

Upon detecting that an input operation has been performed by touching the position where a communication icon is being displayed (step S12), the touch sensor 7*a* notifies the touch sensor driver 7*b* of the coordinates where the touch was detected (step S13). Additionally, the touch sensor driver 7*b* notifies the controller 3 of the coordinates (step S14).

Upon ascertaining that an input operation has been performed on the communication icon corresponding to the coordinates indicated by the notification from the touch sensor driver 7*b*, the controller 3 outputs a wireless communication application 22 activation command to the wireless communication application 22 (step S15). Upon receiving the activation command, the wireless communication application 22 executes the wireless display function, and the mobile client device 10 causes images being displayed on the display 12 to be displayed on the display screen of another electronic device.

In this way, according to a conventional process, the user first presses a power button and performs a screen unlocking operation in order to cancel the suspended state. After that, an NFC touch is performed, and after selecting a communication icon on a user selection UI displayed due to resuming, the wireless display function is executed. For this reason, there are many steps from the suspended state until initiating wireless display, and the operations are burdensome.

Figure 9:
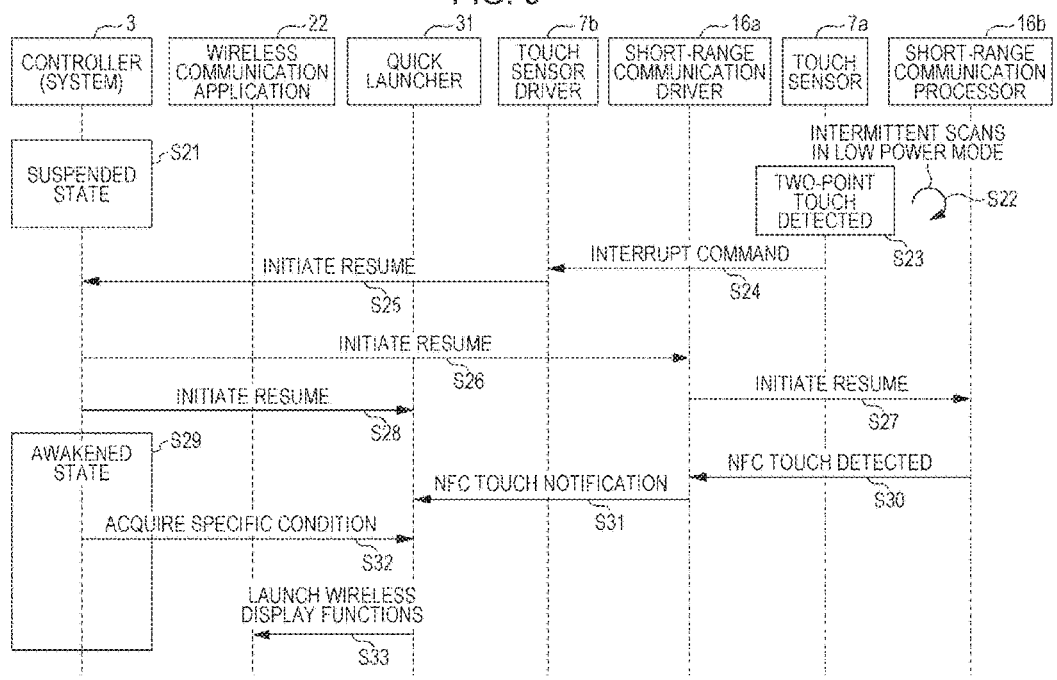
FIG. 9 is a sequence diagram illustrating an exemplary process in which short-range communication is conducted by an operation according to an exemplary embodiment of the present disclosure.

FIG. 9 is a sequence diagram illustrating an exemplary process in which a wireless display function is executed by an operation according to this exemplary embodiment.

First, the system is taken to be in a suspended state (step S21). If in a suspended state, the mobile client device 10 waits for the detection of a touch operation in a low-power mode where power consumption is kept low by intermittently scanning the touch sensor 7*a* (step S22).

If operational input is performed on the touch panel 7 with the second gesture operation (two-point touch) that instructs the initiation of the wireless display function, the touch sensor 7*a* detects that operational input has been performed (step S23). At this point, the touch sensor 7*a* outputs a special interrupt command for waking the system to the touch sensor driver 7*b* (step S24).

Note that when the controller 3 is in a suspended state, processing is not conducted even if ordinary interrupt commands are received. However, the special interrupt command is one that instructs the controller 3 to initiate resuming. For this reason, upon receiving the special interrupt command, the controller 3 conducts processing to initiate resuming and transition from a suspended state to an awakened state.

The touch sensor driver 7*b* outputs the special interrupt command in the form of a command to the controller 3 that activates resuming of the system (step S25). Thus, the controller 3 initiates resuming, and in addition, outputs a command that initiates resuming of the short-range communication driver 16*a* (step S26). The short-range communication driver 16*a* causes the short-range communication processor 16*b* to conduct power-on processing and initialization processing, and outputs a command to initiate resume processing (step S27). Thus, the short-range communication processor 16*b* is powered on and initialization processing is conducted. The short-range communication processor 16*b* then initiates resuming. Additionally, the controller 3 outputs a command that initiates resuming of the quick launcher 31 (step S28).

The controller 3 ends resuming of the system and enters an awakened state (step S29). If the system enters an awakened state and an NFC touch is performed, the short-range communication processor 16*b* notifies the short-range communication driver 16*a* that it has detected an NFC touch (step S30). The short-range communication driver 16*a* then notifies the quick launcher 31 that an NFC touch has been performed (step S31).

After that, the quick launcher 31 acquires a specific condition from the controller 3 (step S32). The specific condition is, for example, a condition for selecting which function the quick launcher 31 causes the wireless communication application 22 to execute in the case where a gesture operation detected by the touch sensor 7*a* is performed with one or two fingers. Herein, since a two-point touch is being detected, the quick launcher 31 outputs a command activating the wireless display function to the wireless communication application 22 (step S33).

The wireless communication application 22 executes the wireless display function with respect to the other electronic device that was NFC touched.

Note that to execute the tethering function illustrated in FIG. 7A, it may be configured such that the touch sensor 7*a* detects a one-point touch in step S23 and the quick launcher 31 instructs the wireless communication application 22 to execute the tethering function.

According to the mobile client device 10 in accordance with an exemplary embodiment described above, a desired wireless function is rapidly executed even if in a suspended state if an NFC touch is performed after the user performs operational input on the touch panel 7 with a specific gesture operation. For this reason, it is not necessary to perform an operation selecting the wireless communication application 22 after causing a home screen enabling NFC to be displayed as in the past, and the input operations that the user must perform can be simplified.

Additionally, respective modules in the hardware layer and middleware layer output commands directly to respective units included in the hardware layer and issue instructions for initiating a tethering function or a wireless display function while bypassing applications in the HMI layer (see FIG. 3). For this reason, various functions assigned to gesture operations can be executed without waiting for the time-consuming activation processes for applications in the HMI layer, and operability is improved for the user.

For example, if a first gesture operation is performed on the touch panel 7 of a mobile client device 10 in a suspended state, it is possible to rapidly activate the short-range communication driver 16*a* and the short-range communication processor 16*b* and execute a tethering function without operating the operable keys 8. For this reason, the mobile client device 10 can be used to rapidly connect a PC, etc. to a network without performing the burdensome operations of activating the mobile client device 10 and searching for the tethering function.

Also, if a second gesture operation is performed on the touch panel 7, it is possible to rapidly activate the short-range communication driver 16*a* and the short-range communication processor 16*b* and execute a wireless display function. Likewise in this case, since the wireless communication application 22 is activated after detecting an NFC touch, it becomes possible to rapidly conduct wireless display on the other device that was NFC touched.

Also, even if a first or second gesture operation is performed and the system changes from a suspended state to an awakened state, the system is made to return to the suspended state if an NFC touch is not detected within a given amount of time. Thus, the mobile client device 10 is able to save power without automatically activating the wireless communication application 22 until an NFC touch is performed.

In addition, the consumption of power can be reduced by using an intermittent scan when the mobile client device 10 is in a suspended state. Also, in the case where the region where the touch sensor 7*a* detects operational input is all or part of the touch sensor 7*a*, it can be respectively determined if the user is intentionally performing operational input by computing the distribution of capacitance values. For this reason, it is possible to prevent mistaken determinations that operational input has been performed with respect to unintentional operational input, such as the case where the user's body indirectly contacts the touch panel 7 of a mobile client device 10 that is inside the user's pocket.

Note that although examples applied to home screen activation, imaging, and music playback have been described for the mobile client device 10 according to an exemplary embodiment discussed above, any application besides the above is acceptable insofar as it is an application desirable for immediate activation and use. For example, a map application that indicates the current location, etc., or an application that logs into a social networking service (SNS) or accesses a blog or news site is also acceptable.

Additionally, although the first and second gesture operations discussed above are ones that switch between one-point and two-point touch, other gesture operations may also be assigned.

Also, although in step S23 of FIG. 9 the detection of a two-point touch by the touch sensor 7*a* is taken to be the operation that initiates a process, the detection of an NFC touch by the short-range communication processor 16*b* may also be taken to be the operation that initiates a process. In this case, the short-range communication processor 16*b* may be activated in advance.

Exemplary Modifications

Meanwhile, exemplary modifications of the mobile client device 10 include the following.

For example, if connection information for connecting to a website (URL: Uniform Resource Locator) being displayed on the PC 40 is received from the PC 40 by the M2M communication processor 16, the controller 3 may cause the display 12 to display the website on the basis of the connection information. In this case, the same website can be displayed on both the PC 40 and the mobile client device 10, making data synchronization, etc. easier to conduct.

Different gesture operations may also be assigned when selecting a payment service using NFC. For example, it may be configured such that Suica (registered trademark) is selected for payment in the case of contacting the touch panel 7 with one finger, and Edy (registered trademark) in the case of contacting with two fingers.

Also, by combining sensor values output by the sensor unit 18 rather than just various gesture operations operationally input on the touch panel 7, it is possible for the mobile client device 10 to rapidly realize functions used by the user. At this point, in the case where the touch sensor 7*a* detects that an input operation has been performed on the touch panel 7 during a suspended state, the controller 3 selects a controlled unit on the basis of sensor values and causes the selected controlled unit to execute given operations. For example, if the sensor unit 18 is provided with a gyro sensor, it may be configured such that the orientation in which the mobile client device 10 is placed is determined on the basis of sensor values from the gyro sensor. Similarly, it may also be configured such that the orientation of the mobile client device 10 can be determined using a geomagnetic sensor.

In this way, the type of operational input performed on the mobile client device 10 can be determined on the basis of sensor values (acceleration values) from an acceleration sensor included in the sensor unit 18, in addition to a gesture operation performed on the touch panel 7. Furthermore, by combining gesture operations and sensor values, it also becomes possible to determine multiple use cases. For example, if a determination condition regarding "whether the mobile client device 10 is in portrait or landscape" is added in addition to a determination condition for "whether a gesture operation performed on the touch panel 7 is one-point or two-point", it becomes possible to distinguish four use cases.

However, the types of gesture operations are not limited to those of the exemplary embodiment discussed above, and for example pinch operations and tap operations may also be combined. Also, communication functions may be executed by performing an NFC touch while tracing a circular pattern on the touch panel 7 or pressing one of the operable keys 8 (for example, a volume button not illustrated), for example, rather than just performing an NFC touch while contacting the operable surface with one finger or two fingers. In this way, it is possible to modify the combinations of appropriate gesture operations and functions, etc. according to the specifications of the mobile client device 10. Additionally, although operation would become more complex, gesture operations with three or more stages may also be combined.

Additionally, although an example of using NFC as the communication standard for conducting short-range wireless communication with the mobile client device 10 has been described, other communication standards may also be used. For example, infrared communication or Bluetooth (registered trademark) may also be used. Also, communication is not limited to being wireless, and wired communication may also be conducted.

In addition, the present disclosure may be applied not only to a mobile client device 10 having telephony functions, but also to a mobile information client that lacks telephony functions, such as an electronic dictionary, a personal digital assistant (PDA), or a music player.

Additionally, although the range of the short-range wireless communication was taken to be such that the mobile client device 10 is brought within approximately 1 cm of the PC 40, a range in which short-range wireless communication can still be conducted when brought within approximately 1 cm to several meters is also acceptable.

Additionally, a series of processes according to the foregoing exemplary embodiment may also be executed in software in some cases. In such cases, a program constituting such software may be executed by a computer built into special-purpose hardware, or alternatively, by a computer onto which programs for executing various functions are installed. For example, a program constituting the desired software may be installed and executed on a general-purpose personal computer.

Also, a recording medium storing program code of software that realizes the functions of the foregoing exemplary embodiment may also be supplied to a system or apparatus. It is furthermore obvious that the functions are realized by a computer (or CPU or other control apparatus) in such a system or apparatus reading out and executing the program code stored in the recording medium.

The recording medium used to supply program code in this case may be a flexible disk, hard disk, optical disc, magneto-optical disc, CD-ROM, CD-R, magnetic tape, non-volatile memory card, or ROM, for example.

Also, the functions of the foregoing exemplary embodiment are realized by executing program code read out by a computer. In addition, some or all of the actual operations are conducted on the basis of instructions from such program code by an OS, etc. running on the computer. This also includes cases where the functions of the foregoing exemplary embodiment are realized by such operations. In addition, processes according to the exemplary embodiment may also be realized in hardware rather than being executed in software as described above.

Furthermore, the present disclosure is not limited to the foregoing exemplary embodiment, and obviously various other exemplary applications and modifications may be obtained insofar as they do not depart from the principal matter of the present disclosure stated in the claims. For this reason, it is to be understood as obvious by persons skilled in the art that various modifications, combinations, and other embodiments may occur depending on design or other factors insofar as they are within the scope of the claims or their equivalents.

Additionally, the present disclosure may also take configurations like the following.

(1) An information processing apparatus including:
a touch panel;
a near field communication interface; and
circuitry configured to
detect that an input received at the touch panel corresponds to a predetermined input when the information processing apparatus is in a suspended state; and
control the information processing apparatus execute a predetermined function via the near field communication interface and awake from the suspended state upon detecting that the input corresponds to the predetermined input.

(2) The information processing apparatus of (1), further including:
a sensor unit configured to detect an orientation of the information processing apparatus.

(3) The information processing apparatus of (2), wherein the circuitry is configured to determine the predetermined function to be executed based on the detected input received at the touch panel and an output of the sensor unit.

(4) The information processing apparatus of (1), wherein the circuitry is configured to:
store a plurality of predetermined inputs that each correspond to one of a plurality of different functions to be executed via the near field communication interface.

(5) The information processing apparatus of (4), wherein the circuitry is configured to:
detect that the input received at the touch panel corresponds to one of the plurality of predetermined inputs; and
control the information processing apparatus to execute, as the predetermined function, the one of the plurality of predetermined functions corresponding to the detected input via the near field communication interface.

(6) The information processing apparatus of (5), wherein a first of the plurality of predetermined inputs corresponds to a single touch operation by an operation member on the touch panel and a second of the plurality of predetermined inputs corresponds to a simultaneous touch of two operation members on the touch panel.

(7) The information processing apparatus of (1), further including:
a memory, wherein
the circuitry is configured to control, as the predetermined function, the near field communication interface to transmit data stored in the memory to another information processing apparatus upon detecting that the input corresponds to the predetermined input.

(8) The information processing apparatus of (1), wherein the circuitry is configured to:
control, as the predetermined function, the near field communication interface to receive data from another information processing apparatus upon detecting that the input corresponds to the predetermined input.

(9) The information processing apparatus of claim 1, further including:
a wireless interface configured to connect to a wireless network, wherein
the circuitry is configured to control, as the predetermined function, the near field communication interface to receive connection data corresponding to a website from another information processing apparatus, control the wireless interface to access the website based on the receive connection data, and control the near field communication interface to forward data received from the website via the wireless interface to the another information processing apparatus via the near field communication interface.

(10) The information processing apparatus of (1), wherein the circuitry is configured to:
transmit a first activation command to the near field communication interface instructing the near field communication interface to be activated upon detecting that the input corresponds to the predetermined input.

(11) The information processing apparatus of (10), wherein the circuitry is configured to:
transmit a second activation command to a middleware layer instructing the middleware layer to be activated after transmitting the first activation command to the near field communication interface.

(12) The information processing apparatus of (11), wherein the middleware layer is configured to:

control execution of the predetermined function via the near field communication interface based on the second activation command.

(13) The information processing apparatus of (1), wherein the suspended state of the information processing apparatus corresponds to a state in which application software and middleware of the information processing apparatus are not activated.

(14) The information processing apparatus of (13), wherein operation of the near field communication interface is controlled via the application software and the middleware upon detecting that the input corresponds to the predetermined input while the information processing apparatus is in an activated state, and operation of the near field communication interface is controlled via only by activating the middleware upon detecting that the input corresponds to the predetermined input while the information processing apparatus is in the suspended state.

(15) The information processing apparatus of (1), wherein the touch panel is configured to:

scan for an input at a first frequency when the information processing apparatus is in an activated state and scan for an input at a second frequency when the information processing apparatus is in the suspended state, wherein the first frequency is higher than the second frequency.

(16) An information processing method performed by an information processing apparatus including a touch panel and a near field communication interface, the method including:

detecting that an input received at the touch panel corresponds to a predetermined input when the information processing apparatus is in a suspended state; and controlling execution of a predetermined function via the near field communication interface and controlling the information processing apparatus to awake from the suspended state upon detecting that the input corresponds to the predetermined input.

(17) A non-transitory computer-readable medium including computer program instructions, which when executed by an information processing apparatus including a touch panel and a near field communication interface, cause the information processing apparatus to:

detect that an input received at the touch panel corresponds to a predetermined input when the information processing apparatus is in a suspended state; and control execution of a predetermined function via the near field communication interface and control the information processing apparatus to awake from the suspended state upon detecting that the input corresponds to the predetermined input.

The invention claimed is:

1. An information processing apparatus comprising:
a touch panel;
a near field communication interface; and
circuitry configured to
receive an input at the touch panel while the information processing apparatus is in a suspended state;
detect that the input received at the touch panel corresponds to a predetermined input when the information processing apparatus is in the suspended state; and
control the information processing apparatus to execute a predetermined function via the near field communication interface and awake from the suspended state upon detecting that the input corresponds to the predetermined input, wherein the suspended state of the information processing apparatus corresponds to a state in which application software and middleware of the information processing apparatus are not activated, and wherein operation of the near field communication interface circuit is controlled via the application software and the middleware upon detecting that the input corresponds to the predetermined input while the information processing apparatus is in an activated state, and operation of the near field communication interface circuit is controlled via only by activating the middleware upon detecting that the input corresponds to the predetermined input while the information processing apparatus is in the suspended state.

2. The information processing apparatus of claim 1, further comprising: a sensor circuit configured to detect an orientation of the information processing apparatus.

3. The information processing apparatus of claim 2, wherein the circuitry is configured to determine the predetermined function to be executed based on the detected input received at the touch panel and an output of the sensor circuit.

4. The information processing apparatus of claim 1, wherein the circuitry is configured to: store a plurality of predetermined inputs that each correspond to one of a plurality of different functions to be executed via the near field communication interface circuit.

5. The information processing apparatus of claim 4, wherein the circuitry is configured to: detect that the input received at the touch panel corresponds to one of the plurality of predetermined inputs; and control the information processing apparatus to execute, as the predetermined function, the one of the plurality of predetermined functions corresponding to the detected input via the near field communication interface circuit.

6. The information processing apparatus of claim 5, wherein a first of the plurality of predetermined inputs corresponds to a single touch operation by an operation member on the touch panel and a second of the plurality of predetermined inputs corresponds to a simultaneous touch of two operation members on the touch panel.

7. The information processing apparatus of claim 1, further comprising: a memory circuit, wherein the circuitry is configured to control, as the predetermined function, the near field communication interface to transmit data stored in the memory circuit to another information processing apparatus upon detecting that the input corresponds to the predetermined input.

8. The information processing apparatus of claim 1, wherein the circuitry is configured to: control, as the predetermined function, the near field communication interface circuit to receive data from another information processing apparatus upon detecting that the input corresponds to the predetermined input.

9. The information processing apparatus of claim 1, further comprising: a wireless interface circuit configured to connect to a wireless network, wherein the circuitry is configured to control, as the predetermined function, the near field communication interface circuit to receive connection data corresponding to a website from another information processing apparatus, control the wireless interface circuit to access the website based on the received connection data, and control the near field communication interface circuit to forward data received from the website via the wireless interface circuit to the another information processing apparatus via the near field communication interface circuit.

10. The information processing apparatus of claim 1, wherein the circuitry is configured to: transmit a first activation command to the near field communication interface circuit instructing the near field communication interface circuit to be activated upon detecting that the input corresponds to the predetermined input.

11. The information processing apparatus of claim 10, wherein the circuitry is configured to: transmit a second activation command to a middleware layer instructing the middleware layer to be activated after transmitting the first activation command to the near field communication interface circuit.

12. The information processing apparatus of claim 11, wherein the middleware layer is configured to: control execution of the predetermined function via the near field communication interface circuit based on the second activation command.

13. The information processing apparatus of claim 1, wherein the touch panel is configured to: scan for an input at a first frequency when the information processing apparatus is in an activated state and scan for an input at a second frequency when the information processing apparatus is in the suspended state, wherein the first frequency is higher than the second frequency.

14. A method performed by an information processing apparatus having a touch panel, a near field communication interface, and circuitry, the method comprising:
receiving, using the circuitry, an input at the touch panel while the information processing apparatus is in a suspended state;
detecting, using the circuitry, that the input received at the touch panel corresponds to a predetermined input when the information processing apparatus is in the suspended state; and
controlling, using the circuitry, the information processing apparatus to execute a predetermined function via the near field communication interface and awake from the suspended state upon detecting that the input corresponds to the predetermined input,
wherein the suspended state of the information processing apparatus corresponds to a state in which application software and middleware of the information processing apparatus are not activated, and
wherein operation of the near field communication interface circuit is controlled via the application software and the middleware upon detecting that the input corresponds to the predetermined input while the information processing apparatus is in an activated state, and operation of the near field communication interface circuit is controlled via only by activating the middleware upon detecting that the input corresponds to the predetermined input while the information processing apparatus is in the suspended state.

15. A non-transitory, computer-readable medium storing computer program instructions that, when executed by an information processing apparatus having a touch panel, a near field communication interface, and circuitry, cause the information processing apparatus to
receive an input at the touch panel while the information processing apparatus is in a suspended state;
detect that the input received at the touch panel corresponds to a predetermined input when the information processing apparatus is in the suspended state; and
control the information processing apparatus to execute a predetermined function via the near field communication interface and awake from the suspended state upon detecting that the input corresponds to the predetermined input,
wherein the suspended state of the information processing apparatus corresponds to a state in which application software and middleware of the information processing apparatus are not activated, and
wherein operation of the near field communication interface circuit is controlled via the application software and the middleware upon detecting that the input corresponds to the predetermined input while the information processing apparatus is in an activated state, and operation of the near field communication interface circuit is controlled via only by activating the middleware upon detecting that the input corresponds to the predetermined input while the information processing apparatus is in the suspended state.

* * * * *